United States Patent Office 3,419,638
Patented Dec. 31, 1968

3,419,638
DYEABLE POLYPROPYLENE
John F. Fuzek, Elizabethton, Tenn., assignor, by mesne assignments, to Beaunit Corporation, New York, N.Y., a corporation of New York
No Drawing. Filed Feb. 14, 1962, Ser. No. 174,353
14 Claims. (Cl. 260—873)

It is the principal object of the present invention to provide useful, melt extrudable polymer blends comprised essentially of isotactic polypropylene which are readily dyeable and which have melt viscosities considerably below the melt viscosity of isotactic polypropylene per se without reducing the excellent physical properties thereof.

G. Natta has described new polymers of the alphaolefins of the type $CH_2\!\!=\!\!CHR$ in which R is a hydrocarbon radical. The polymers of the same alpha olefin, viz polypropylene, have different steric structures; and depending upon their steric configurations they may be crystallizable or amorphous (non-crystallizable).

The crystallizable polymers which have been termed "isotactic" by Natta are linear head-to-tail polymers composed for the most part of crystallizable macromolecules in which the R groups attached to the asymmetric carbon atoms of the repeating monomeric groups lie on one side of the plane and all of the hydrogen atoms attached to the tertiary carbon atoms lie on the other side of the plane when the main body of the chain is fully extended in a plane.

The amorphous polymers are linear head-to-tail polymers in which tertiary asymmetric carbon atoms of the main chain have a random distribution of attached R groups on both sides of the plane when the main chain of the molecule is extended in a plane.

Numerous methods have been disclosed by which it is possible to synthesize prevailingly isotactic polypropylene. The present commercial grades of crystalline polypropylene contain from 80 to 100% of the isotactic form.

Isotactic polypropylene has many attributes such as low density, high tensile strength, and high elastic properties by reason of which it is well suited for the commercial production of films, molded products, industrial ropes, nets, and fibers.

Unfortunately, the use of polypropylene in the textile industry has suffered from the absence of simple dyeing procedures by which a wide variety of deep shades can be applied to polypropylene fibers and materials. Fibers and shaped articles of crystalline polypropylene are only slightly affected by water and organic solvents which are swelling agents for other synthetic fibers. Therefore, polypropylene fibers and films cannot be dyed by the methods which have been successfully applied to other synthetic fibers, e.g., polyamides and polyesters. Disperse dyes which dye polyester fibers to deep shades have very little, if any, affinity for polypropylene fibers.

One method for overcoming the non-receptivity of dye-stuffs comprises grafting dye receptive chains of another polymer onto the chemically modified surface of extruded polypropylene. Another approach is the addition of an uncured epoxy resin to the polypropylene polymer before spinning and subsequently curing the resin before subjecting the fibers or shaped articles to a dyeing procedure.

The application of polypropylene to the textile field is further impaired by its high melt viscosity in comparison with the melt viscosities of other melt extrudable polymers, such as the polyamides and polyesters. Although it is possible to prepare crystalline polypropylene having a reduced melt viscosity, the physico-chemical properties of the fibers formed therefrom suffer due to lowering of the molecular weight and the melt viscosity of the polymer. Thus, special high pressure melt spinning apparatus is presently required in order to successfully spin polypropylene fibers. One attempt to overcome this problem has been rapid heat degradation of high viscosity crystalline polypropylene immediately before extrusion as disclosed in U.S. Patent No. 3,013,003. One disadvantage of this method is discoloration of the polymer and the fibers formed therefrom.

Unexpectedly, I have found that crystalline polypropylene can be made readily dyeable with disperse acetate type dyes and at the same time be reduced sufficiently in viscosity to be spun at lower pressures in melt spinning apparatus conventionally used for spinning polyester fibers by melt blending from about 1 to 20 percent by weight, and preferably, from 5 to 10 percent, of a dye receptive, saturated aromatic polyester with the crystalline polypropylene. I have further unexpectedly found that the resulting polymer melt blend will dye to a deeper shade in comparison with the polyester component per se when subjected to the same dyeing procedure. In addition, I have found unexpectedly that a small amount of the aforesaid polyester reduces the melt viscosity of the melt blend to substantially the same degree as the polyester component per se. The melt viscosity of polypropylene is significant only in relation to the conditions under which it is observed since the viscosity of polypropylene is progressively reduced by heat degradation. In determining the melt viscosities set forth below the polymer or polymer blend was heated for thirty minutes to reach 230° C. The viscosity was then determined using a capillary viscometer.

The saturated aromatic polyesters used in practicing this invention are the polycondensation products of an aromatic dicarboxylic acid with an aliphatic, alicyclic or aromatic glycol. The polyester to be used is admixed with the crystalline polypropylene before melt extrusion to form a homogeneous blend. The melt blend can be extruded through suitable spinnerettes to form directly monofilaments, multifilament yarns, rods, ribbons, films, etc. Extruded rods, etc., may be pelletized to form a raw material for remelting.

The production of terephthalic esters which may be used to modify polypropylene is disclosed in U.S. Patent No. 2,465,319 to Whinfield et al. of Mar. 22, 1949. These polymeric linear terephthalic esters are composed of recurring structural units of the formula:

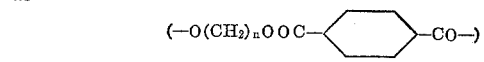

wherein $n$ represents an integer within the range of 2 to 10.

Copolyesters which may be used in accordance with the present invention are disclosed in U.S. Patent No. 2,965,613 to Millone et al. of Dec. 20, 1960. These saturated aromatic polyesters are composed of linear molecules of high average molecular weight in which two kinds of repeating units, ethylene terephthalate:

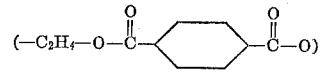

and ethylene isophthalate

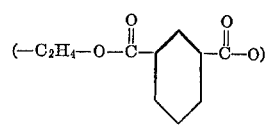

are distributed at random along the polymer chain. A copolymer of this type is sold under the trademark "Vitel."

The following examples, in which all parts are by weight unless otherwise specified, are given to illustrate the invention.

EXAMPLE I

Ninety parts polypropylene (melt viscosity 800 poises) were mixed with 10 parts of "Vitel," a 90/10 copolymer of polyethylene terephthalate and isophthalate (melt viscosity 35 poises). The melted blend (melt viscosity 90 poises) was extruded at 250° C. through a spinnerette. The filaments obtained were oriented by stretching with a ratio of 4.5 to 1.

The stretched, oriented filaments had the following characteristics:

| | |
|---|---|
| Tenacity _____ g./d__ | 4.66 |
| Elongation _____ percent__ | 36.3 |
| Density _____ | .937 |
| Melting point _____ ° C__ | 168–170 |

The receptivity for disperse type dyes was excellent and the colors were generally fast.

EXAMPLE II

The same polymer blend of Example I was cast into a film. The film readily accepted disperse type dyes.

EXAMPLE III

Ninety-five parts polypropylene (melt viscosity 800 poises) were mixed with five parts of a 90/10 copolymer of ethylene terephthalate and isophthalate (melt viscosity 40 poises). The melted blend (melt viscosity 90 poises) was extruded through a spinnerette at 250° C. The filaments obtained were oriented by stretching with a ratio of 4.5 to 1.

The stretched, oriented filaments had the following properties:

| | |
|---|---|
| Tenacity _____ g./d__ | 3.58 |
| Elongation _____ percent__ | 62.0 |
| Density _____ | 0.922 |
| Melting point _____ ° C__ | 168–170 |

The receptivity for disperse dyes was excellent and the colors were generally fast.

EXAMPLE IV

Ninety parts polypropylene (melt viscosity 800 poises) were mixed with ten parts of the polyethylene terephthalate (melt viscosity 35–40 poises) disclosed in U.S. Patent No. 2,465,319. The melted blend (melt viscosity 90 poises) was extruded at 250° C. through a spinnerette. The resulting fibers were drawn with a ratio of 4.5 to 1.

The stretched, oriented filaments had substantially the same physical and dyeing properties as the fibers in Example I.

EXAMPLE V

Ninety parts polypropylene (melt viscosity 800 poises) were mixed with ten parts of a 30/70 blend of cis/trans poly (1,4-cyclohexylenedimethylene terephthalate) (melt viscosity 40 poises) as disclosed in U.S. 2,901,466. The resulting blend was melted (melt viscosity 90 poises) and extruded at 250° C. through a spinnerette. The resulting filaments after being drawn had substantially the same physical and dyeing properties as the fibers of Example I.

EXAMPLE VI

Fifty parts polypropylene (melt viscosity 800 poises) were mixed with 50 parts of "Vitel" polyester polymer (melt viscosity 35 poises). The resulting blend was melted and extruded at 250° C. through a spinnerette. The resulting filaments were drawn to a ratio of 4.5 to 1. The stretched, oriented filaments had the following physical characteristics:

| | |
|---|---|
| Tenacity _____ g./d__ | 3.2 |
| Elongation _____ percent__ | 12 |

The receptivity of the fibers for disperse dyestuffs was good.

Among the disperse type dyes which are suitable for dyeing the modified polypropylene fibers, films, etc.: "Setacyl Blue," "Artisil Yellow," "Diazo Black B," and "Celliton Fast Pink."

The following conventional dyeing procedure was employed to substantiate this invention. The modified polypropylene fibers and films were boiled in a solution containing from 0.1% to 2.0% disperse dyestuff, 10% diethylene glycol, and 0.25% octyl phenol ethoxylate which is sold under the trademark "Triton X–100" for one hour. The dyed filaments were rinsed and boiled in 5% soap solution.

The polypropylene used in practicing the invention is essentially isotactic (crystallizable) of sufficient molecular weight to be melt extrudable into shaped articles with the content of atactic (non-crystallizable) polymer contained therein being not in excess of 15 percent.

Instead of filaments, fibers, and films as shown in the examples, other shaped articles may be molded from the blend of isotactic polypropylene and saturated aromatic polyester. Furthermore, the polyester which is added to the polypropylene may be a blend of two or more saturated aromatic polyesters.

Although I have found that the optimum dye receptivity and lowered viscosity are reached with the addition of less than 20 percent of a saturated aromatic polyester, nevertheless, larger amounts of a polyester modifier (up to about 75%) may be used to form novel hybrid polymers, i.e., polymers possessing both polyolefin and polyester properties.

It will be understood readily by those skilled in the art that these examples are merely illustrative of the present invention and that it is intended to cover all modifications and variations coming within the scope of the appended claims.

I claim:

1. As a new composition of matter, a dyeable, substantially stable, extrudable melt blend comprising high melt viscosity polypropylene and from about 1% to 20% based on the weight of the polypropylene of a polyalkylene terephthalate having a melt viscosity substantially lower than that of the polypropylene, said terephthalate being composed of recurring structural units of the formula:

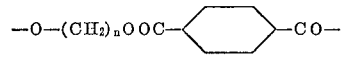

wherein $n$ represents an integer within the range of 2 to 10, said polypropylene comprising at least about 85% of isotactic macromolecules, and said blend having a melt viscosity of the same degree as that of said polyester.

2. As a new composition of matter, a dyeable, substantially stable, extrudable melt blend comprising high melt viscosity polypropylene and from about 1% to 20% based on the weight of the polypropylene of a saturated aromatic polyester composed of linear molecules of high average molecular weight in which two kinds of repeating units, ethylene terephthalate and ethylene isophthalate are distributed at random along the polymer chain said polyester having a melt viscosity substantially lower than that of the polypropylene and said blend having a melt viscosity of the same degree as that of the polyester, and said polypropylene comprising at least about 85% of isotactic macromolecules.

3. As a new composition of matter, a dyeable, substantially stable, extrudable melt blend comprising high melt viscosity polypropylene and from about 1% to 20% based on the weight of the polypropylene of a poly (1,4-cyclohexylenedimethylene terephthalate), said poly (1,4-cyclohexylenedimethylene terephthalate) having a melt viscosity substantially lower than that of the polypropylene and said blend having a melt viscosity of the same degree as that of said poly(1,4-cyclohexylenedimethylene terephthalate), and said polypropylene comprising at least about 85% of isotactic macromolecules.

4. The process of simultaneously imparting dye receptivity to polypropylene and substantially reducing the melt viscosity thereof which comprises adding to high melt viscosity polypropylene comprising at least about 85% by weight of isotactic macromolecules at least about one percent by weight based upon the weight of the polypropylene of a polyester selected from the group consisting of a polyalkylene terephthalate, a random co-polymer of ethylene terephthalate and ethylene isophthalate, and a poly(1,4-cyclohexylenedimethylene terephthalate), said polyester having a melt viscosity substantially lower than that of said polypropylene, and fusing said mixture to produce a homogenous polypropylene-polyester blend.

5. The process according to claim 4 wherein the polyester is a polyalkylene terephthalate.

6. The process according to claim 4 wherein the polyester is a random copolymer of ethylene terephthalate and ethylene isophthalate.

7. The process according to claim 4 wherein the polyester is a poly(1,4-cyclohexylenedimethylene terephthalate).

8. The process according to claim 4 wherein from about one percent to about twenty percent of said polyester is added to said polypropylene.

9. The process according to claim 8 wherein the polyester is a polyalkylene terephthalate.

10. The process according to claim 8 wherein the polyester is a random copolymer of ethylene terephthalate and ethylene isophthalate.

11. The process according to claim 8 wherein the polyester is a poly(1,4-cyclohexylenedimethylene terephthalate).

12. A dyeable composition comprising fiber-forming, crystalline polypropylene and from about 1% to 20% based on the weight of the polypropylene of a polyalkylene terephthalate having a melt viscosity substantially lower than that of the polypropylene, said terephthalate being composed of recurring structural units of the formula:

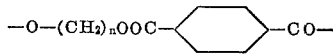

wherein $n$ represents an integer within the range of 2 to 10.

13. A dyeable composition comprising fiber-forming, crystalline polypropylene and from about 1% to 20% based on the weight of the polypropylene of a saturated aromatic polyester composed of linear molecules of high average molecular weight in which two kinds of repeating units, ethylene terephthalate and ethylene isophthalate are distributed at random along the polymer chain.

14. A dyeable composition fiber-forming crystalline polypropylene and from about 1% to 20% based on the weight of the polypropylene of a poly(1,4-cyclohexylene dimethylene terephthalate) having a melt viscosity substantially lower than that of the polypropylene.

References Cited

UNITED STATES PATENTS

| | | | |
|---|---|---|---|
| 2,688,008 | 8/1954 | Chaney et al. | 260—45.4 |
| 3,003,845 | 10/1961 | Ehlers | 260—45.4 |

FOREIGN PATENTS

| | | |
|---|---|---|
| 625,629 | 8/1961 | Canada. |
| 538,782 | 12/1955 | Belgium. |
| 563,123 | 6/1960 | Belgium. |
| 769,405 | 3/1957 | Great Britain. |

WILLIAM H. SHORT, *Primary Examiner.*

LOUISE P. QUAST, *Assistant Examiner.*

U.S. Cl. X.R.

8—55; 260—75; 264—176